(12) United States Patent
Stephan et al.

(10) Patent No.: US 6,715,472 B2
(45) Date of Patent: Apr. 6, 2004

(54) COLD STARTER FOR AN AUTOMOBILE ENGINE

(75) Inventors: Ulrich Stephan, Erligheim (DE); Steffen Geiger, Asperg (DE)

(73) Assignee: Beru AG, Ludwigsburg (DE)

( * ) Notice: Subject to any disclaimer, the term of this patent is extended or adjusted under 35 U.S.C. 154(b) by 0 days.

(21) Appl. No.: 10/062,559

(22) Filed: Feb. 5, 2002

(65) Prior Publication Data

US 2002/0117157 A1 Aug. 29, 2002

(30) Foreign Application Priority Data

Feb. 5, 2001 (DE) .......................................... 101 05 331

(51) Int. Cl.[7] .............................................. F02M 31/04
(52) U.S. Cl. ....................................................... 123/549
(58) Field of Search .................................. 123/549, 556

(56) References Cited

U.S. PATENT DOCUMENTS

| | | | | | |
|---|---|---|---|---|---|
| 2,889,904 A | * | 6/1959 | Martinoli | ............... | 123/568.11 |
| 3,996,912 A | * | 12/1976 | Dreisin et al. | ......... | 123/179.21 |
| 4,020,815 A | * | 5/1977 | Hubert | ........................ | 123/556 |
| 4,089,214 A | * | 5/1978 | Egami et al. | ................ | 123/549 |
| 4,667,644 A | * | 5/1987 | Hori et al. | ................... | 123/556 |
| 4,682,576 A | | 7/1987 | Nakamura et al. | | |
| 4,685,437 A | * | 8/1987 | Tanaka et al. | ............... | 123/549 |
| 5,284,122 A | * | 2/1994 | Will et al. | ................... | 123/549 |
| 5,908,021 A | * | 6/1999 | Garcia | ......................... | 123/556 |
| 5,988,146 A | * | 11/1999 | Anderson et al. | ........... | 123/556 |
| 5,992,399 A | * | 11/1999 | Anderson et al. | ........... | 123/549 |

FOREIGN PATENT DOCUMENTS

| | | |
|---|---|---|
| CH | 176722 | 7/1935 |
| DE | 34 25 378 A1 | 1/1985 |
| WO | WO 00/34643 | 6/2000 |

OTHER PUBLICATIONS

De–Zeitschrift: Motor–Rundschau 22/1963, Bild 5.

* cited by examiner

*Primary Examiner*—Marguerite McMahon
(74) *Attorney, Agent, or Firm*—Nixon Peabody LLP; David S. Safran

(57) ABSTRACT

Cold starter for use with a diesel engine having a combustion chamber, an intake air channel, and an air filter, which includes an electrical heating device mounted either in the intake air channel or within the air filter casing.

14 Claims, 3 Drawing Sheets

COLD STARTER FOR AN AUTOMOBILE ENGINE

BACKGROUND OF THE INVENTION

1. Field of the Invention

The invention relates to a cold starter for an automobile engine which includes an electrical heating device mounted either in the intake air channel or within the air filter casing.

2. Description of Related Art

Conventional diesel engines are normally assisted with glow plugs during cold starts in the ignition and combustion process, and in particular are assisted with a rod glow plug. In this construction, the electrical energy converted into heat is often inadequate for optimal starting and engine warm up in terms of providing quiet running and proper exhaust gas composition.

SUMMARY OF THE INVENTION

The object of the invention is to provide a cold starter, in the environment of the quick-start systems of automobile diesel engines in demand today, which improves the cold-start behavior and warm-up characteristics.

This object is achieved according to the invention by the cold starter comprising a heating element mounted either in the intake air channel or within the air filter casing.

DETAILED DESCRIPTION OF THE INVENTION

Figure 1:
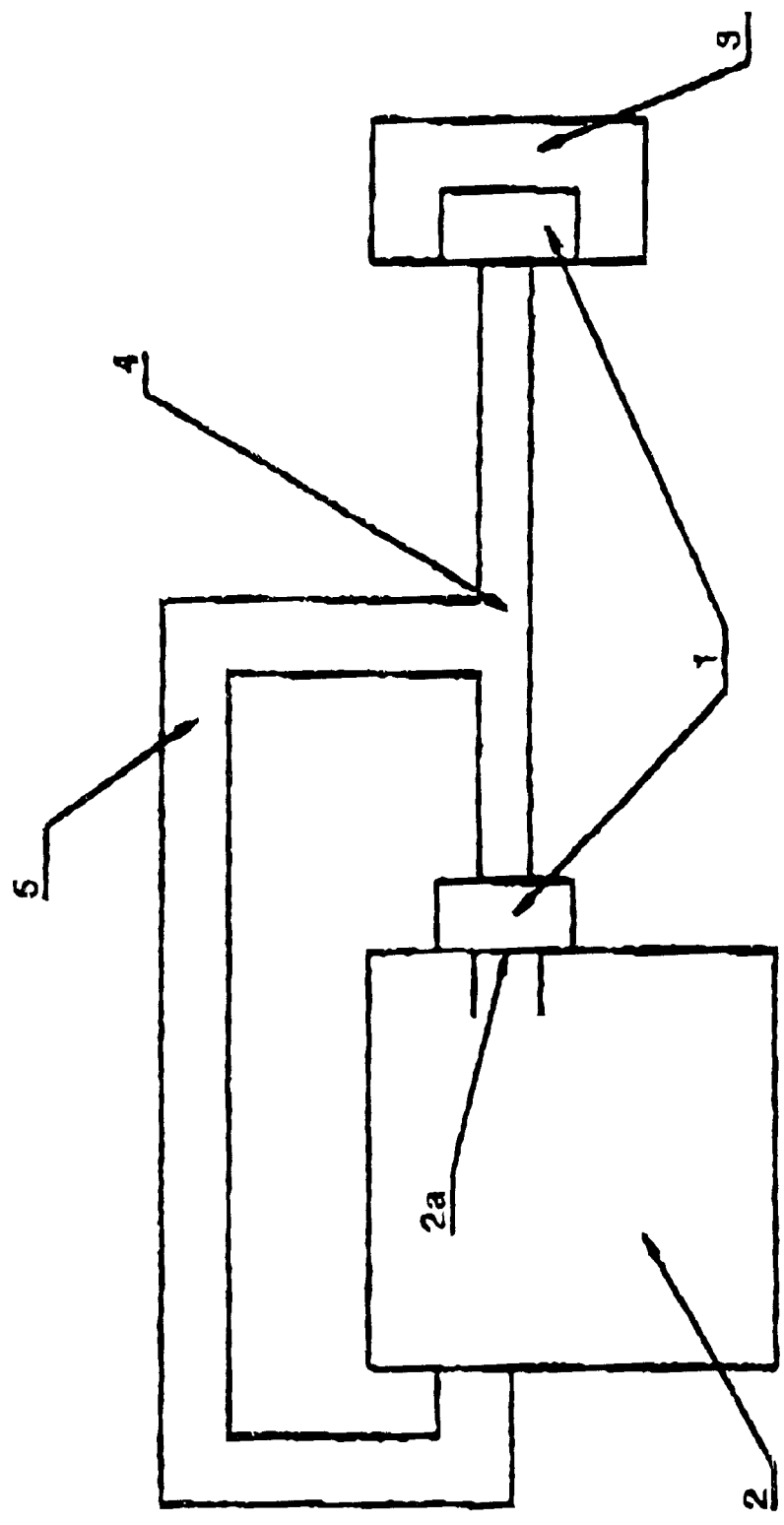
FIG. 1 is a diagrammatic depiction of a preferred embodiment of the invention.

In FIG. 1, the cold starter according to the invention includes an engine combustion chamber 2 with a combustion chamber inlet 2a, an intake air channel 4 along with an exhaust gas return channel 5, and an air filter 3 to filter the intake air. Located between the combustion chamber inlet 2a and point where the exhaust gas return channel 5 opens into the intake air channel 4 is a heating device 1. As an alternative, a heating device can instead also be provided in the air filter 3. The heating device 1 is situated inside the intake air channel 4, preferably inserted into the intake air channel 4 with connecting sleeves on either side, or is situated in particular between the intake air duct and cylinder head at the end of the intake air channel, in order to heat the intake air to the ignition temperature of the propulsion mixture within the combustion chamber.

Particularly preferred is an arrangement in which the heating device is designed as a heating flange connected directly to the combustion chamber inlet 2a of the engine 2. As described in detail below, the heating flange preferably has band heater elements in a mounting frame.

The heating device 1 is designed in such a way that the intake air is heated in the range of about 25 to 50 K in the underload range, and to this end, a heating load of up to 2 KW is required depending on the model of diesel engine. Since the intake air has to be heated for only a few revolutions during a cold start, the start process can be initiated at a relatively lower heating capacity after a relatively shorter preheating period. The temperature of the heater band surface can reach levels of between approx. 900° C. and 1100° C. in still air; the temperature normally drops to about 500° C. to 600° C. during underload operation.

The heating device is designed for a continuous operating voltage within the vehicle operating voltage, e.g., an 8 V continuous voltage of a 12 V vehicle electrical system. It is found that the heating device is undamaged by the excessively elevated operating voltage during the preheating phase, and the temperature is reduced by the passing cold intake air during engine operation to such a degree that no damage is caused by the excessively elevated operating voltage. As an alternative, it is possible that the heating element of the heating device 1 operates using PTC's, or is controlled or regulated by an external drive circuit. With the correct design of the heating device 1 according to the invention, a conventional rod glow plug need not be used for ignition.

In another embodiment, integrating the heating device 1 into the air filter casing 3 makes more rebound space available, so that the heating element temperature can be held significantly lower to achieve the same heating capacity. In this case, for example, a PTC heating element with lamellae can be used as the heating element of the heating device 1 for heat transmission instead of a heating band.

Figure 2:
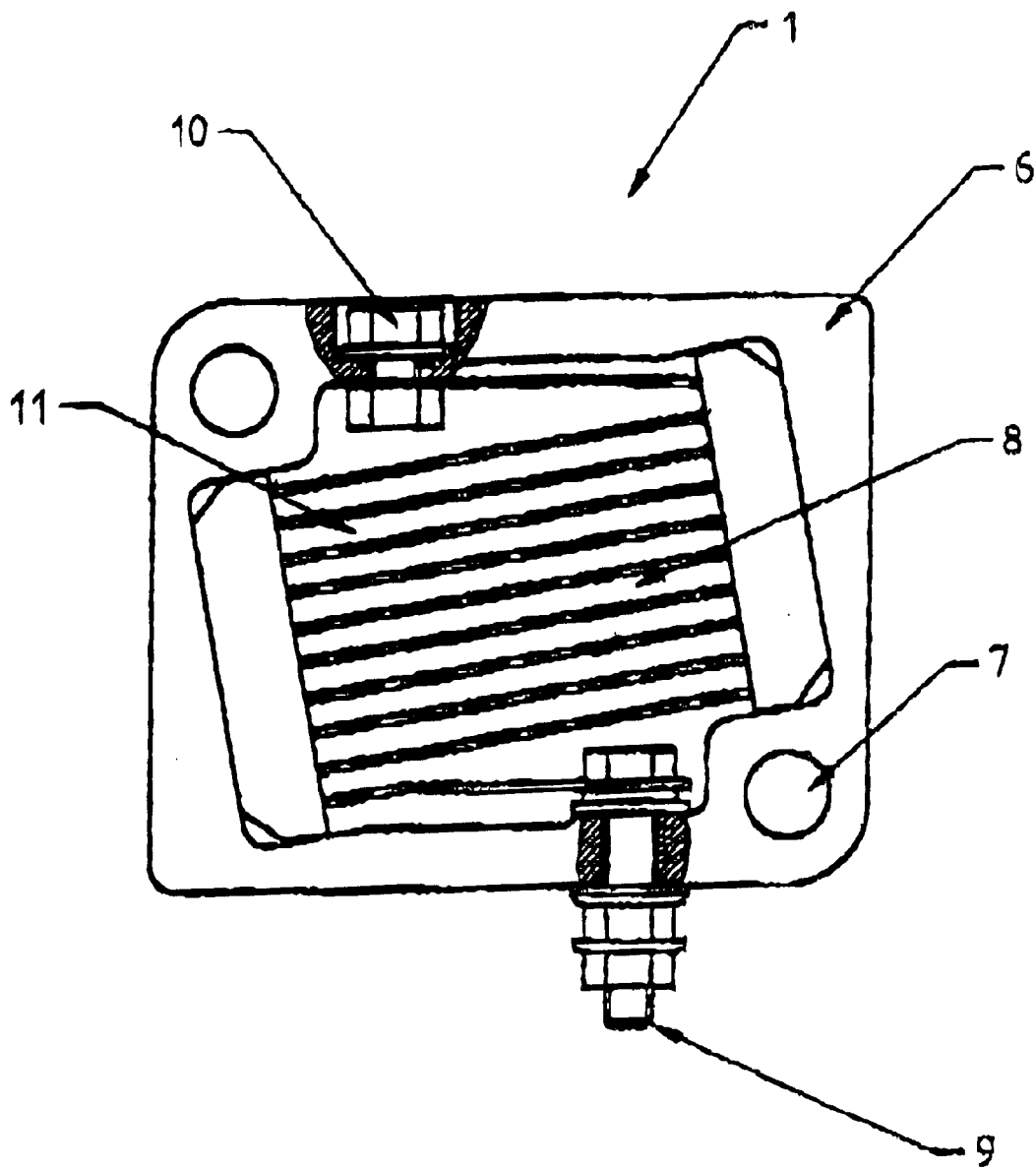
FIGS. 2 & 3 show a cross section through a heating element according to the preferred embodiment according to FIG. 1 and of an alternative embodiment, respectively.

According to FIG. 2, a heating flange which is preferably used as the heating device 1 includes a frame 6 with attachment boreholes 7. The frame is shaped in such a way that it can be flanged to the engine intake 2a and fit between the intake channel 4 and combustion inlet 2a.

Provided as a heating resistor is a heating band 8, which, for example, meanders in the through-flow area 11 of the intake air. In this case, the heating band 8 is designed in such a way that the thermal energy can be released to the intake air over as great a surface area as possible, while the flow resistance is simultaneously kept as low as possible. The width of the heating band 8 preferably ranges between 10 mm and 20 mm.

In the embodiment of FIG. 2, the heating band 8 can be contacted with the supply voltage by a threaded terminal end 9, and can be connected to ground at terminal 10.

Figure 3:
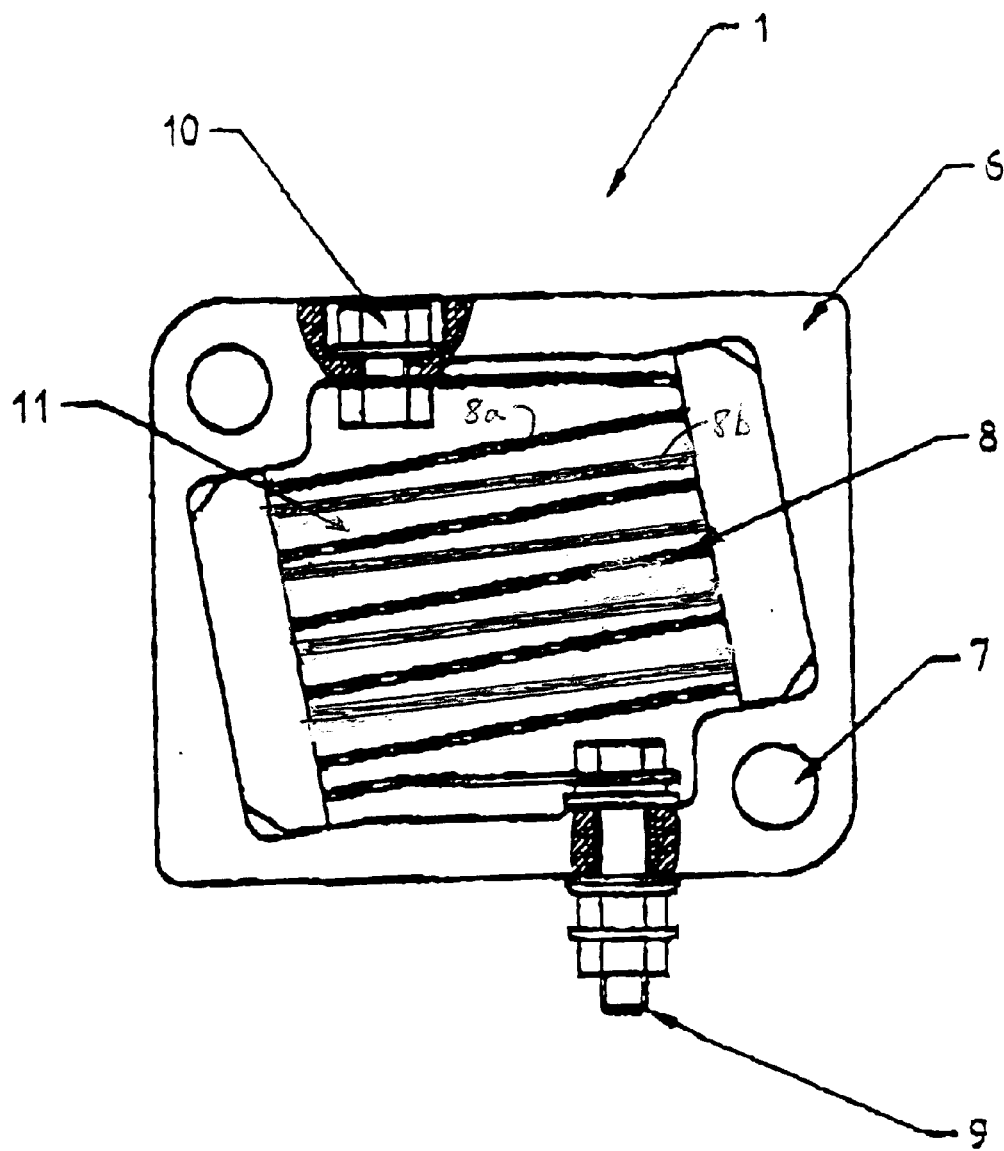

In another embodiment (FIG. 3), the heating band 8 can be divided into two or more partial resistors 8a, 8b situated one after the other in the direction of air intake flow, such that the resistors can be individually or collectively operated depending on the required power. In this embodiment, the heating bands 8a 8b can be angled relative to each other to better deflect the air flow, thereby improving the heat transmission to the intake air.

What is claimed is:

1. A heating arrangement for a diesel engine which includes a diesel engine combustion chamber comprising:

an intake air channel having a discharge end adapted for connection to the diesel engine combustion chamber, an air filter connected to an inlet end of said intake air channel, and an electrical heating device, located in at least one of said end of the intake air channel and a casing of the air filter, constructed as a heating flange comprising
a frame with attachment boreholes, and
a heating band located in the frame as a heating resistor,
wherein the heating band is mounted within the frame with as great a surface area as possible to maximize the thermal energy released to the intake air, while simultaneously being mounted within the frame to minimize the flow resistance to intake air, and the heating band is divided into two or more partial heating resistors located one after the other in the direction of intake air flow, and wherein the partial heating resistors are capable of being operated either individually or jointly.

2. The heating arrangement according to claim 1, wherein the electrical heating device is constructed as a heating flange.

3. The heating arrangement according to claim 2, wherein the heating flange is attached to the intake air inlet of the combustion chamber.

4. The heating arrangement according to claim 1, wherein the heating band has a width of between 10 mm and 20 mm.

5. The heating arrangement according to claim 1, wherein the heating bands are angled relative to each other to better deflect the air flow.

6. The heating arrangement according to claim 2, wherein the heating flange is adapted for continuous operation at a voltage below the vehicle voltage.

7. The heating arrangement according to claim 1, wherein the heating resistor of the electrical heating device has FTC characteristics, or the heating resistor is regulated by an external drive circuit.

8. The heating arrangement according to claim 1, wherein the electrical heating device is located in the casing of the air filter.

9. A diesel engine comprising a combustion chamber, an intake air channel having a discharge end connected to an inlet of the combustion chamber and an air filter connected to the intake air channel at an inlet end of the intake air channel remote from the combustion chamber, and further comprising:

an electrical heating device, located in at least one of said discharge end of the intake air channel and a casing of the air filter, constricted as a heating flange comprising a frame with attachment boreholes, and a heating band located in the frame as a heating resistor, wherein the heating band is mounted within the frame with as great a surface area as possible to maximize the thermal energy released to the intake air, while simultaneously being mounted within the frame to minimize the flow resistance to intake air, and the heating band is divided into two or more partial heating resistors located one after the other in the direction of intake airflow, and wherein the partial heating resistors are capable of being operated either individually or jointly.

10. The diesel engine according to claim 9, wherein the electrical heating device is positioned in said discharge end of the intake air channel and between the combustion chamber inlet of the diesel engine and a junction at which the intake air channel is connected to an exhaust gas return channel.

11. The diesel engine according to claim 9, wherein the heating flange is attached to an intake air inlet of the combustion chamber in order to heat intake air to the ignition temperature of a propulsion mixture within the combustion chamber.

12. The diesel engine according to claim 9, wherein the heating bands are angled relative to each other to better deflect the air flow.

13. The diesel engine according to claim 9, wherein the heating band has a width of between 10 mm and 20 mm.

14. The diesel engine according to claim 9, wherein the electrical heating device is located in the casing of the air filter.

* * * * *